(12) United States Patent
Ishii et al.

(10) Patent No.: US 8,855,646 B2
(45) Date of Patent: Oct. 7, 2014

(54) USER EQUIPMENT, BASE STATION DEVICE, AND MOBILE COMMUNICATION METHOD

(75) Inventors: Hiroyuki Ishii, Yokosuka (JP); Mikio Iwamura, Yokohama (JP); Takeshi Nakamori, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 317 days.

(21) Appl. No.: 12/933,831

(22) PCT Filed: Mar. 19, 2009

(86) PCT No.: PCT/JP2009/055501
§ 371 (c)(1),
(2), (4) Date: Dec. 7, 2010

(87) PCT Pub. No.: WO2009/116643
PCT Pub. Date: Sep. 24, 2009

(65) Prior Publication Data
US 2011/0151876 A1 Jun. 23, 2011

(30) Foreign Application Priority Data
Mar. 21, 2008 (JP) .................................. 2008-074615

(51) Int. Cl.
*H04W 24/02* (2009.01)
*H04W 36/00* (2009.01)
*H04J 11/00* (2006.01)

(52) U.S. Cl.
CPC .............................. *H04W 36/0088* (2013.01); *H04J 11/0069* (2013.01)
USPC ..................... 455/437; 455/550.1; 455/435.3; 455/436; 455/450

(58) Field of Classification Search
USPC .................... 455/437, 550.1, 435.3, 436, 450
See application file for complete search history.

(56) References Cited

U.S. PATENT DOCUMENTS

| 7,672,276 B2 | 3/2010 | Ode et al. |
| 8,094,738 B2 | 1/2012 | Nishio et al. |

(Continued)

FOREIGN PATENT DOCUMENTS

| JP | 2001-54158 A | 2/2001 |
| JP | 2005-051568 A | 2/2005 |

(Continued)

OTHER PUBLICATIONS

3GPP TR 25.814 V7.0.0, "Physical layer aspects for evolved Universal Terrestrial Radio Access (UTRA)," Jun. 2006, 126 pages.

(Continued)

*Primary Examiner* — Jinsong Hu
*Assistant Examiner* — Jean Chang
(74) *Attorney, Agent, or Firm* — Osha Liang LLP

(57) ABSTRACT

User equipment 100*n* comprises a connection state processing section configured so that the connection state processing section measures the communication quality in a cell belonging to two or more layers, reports the result of the measurement to a base station device 200, and performs handover processing according to the instruction from the base station device 200 on the basis of first priority notified by a first control signal notified from the base station device 200 in an RRC_Connected state and a stand-by state processing section configured so that the stand-by state processing section measures the communication quality in the cell belonging to the two or more layers to determine a cell for performing a stand-by according to the result of the measurement on the basis of second priority notified by a second control signal notified from the base station device 200 in an Idle state.

6 Claims, 11 Drawing Sheets

(56) References Cited

U.S. PATENT DOCUMENTS

| | | | |
|---|---|---|---|
| 2008/0058000 A1* | 3/2008 | Tanaka et al. | 455/550.1 |
| 2008/0268843 A1* | 10/2008 | Ore et al. | 455/435.3 |
| 2009/0047958 A1* | 2/2009 | Rimhagen et al. | 455/436 |
| 2009/0181676 A1* | 7/2009 | Lee et al. | 455/436 |
| 2010/0222055 A1* | 9/2010 | Cho et al. | 455/434 |
| 2010/0240367 A1* | 9/2010 | Lee et al. | 455/435.2 |
| 2010/0255849 A1* | 10/2010 | Ore | 455/450 |
| 2012/0051329 A1* | 3/2012 | Hirano et al. | 370/332 |
| 2012/0236832 A1* | 9/2012 | Ogawa | 370/336 |

FOREIGN PATENT DOCUMENTS

| | | |
|---|---|---|
| JP | 2006-197536 A | 7/2006 |
| JP | 2006-262178 A | 9/2006 |
| JP | 2008-061015 A | 3/2008 |
| WO | 2004/112419 A1 | 12/2004 |
| WO | 2007/080892 A1 | 7/2007 |
| WO | 2008/017328 A1 | 2/2008 |

OTHER PUBLICATIONS

3GPP TS 36.300 V8.3.0, "Evolved Universal Terrestrial Radio Access (E-UTRA) and Evolved Universal Terrestrial Radio Access Network (E-UTRAN) ," Dec. 2007, 121 pages.

3GPP TS 36.331 V8.0.0, "Evolved Universal Terrestrial Radio Access (E-UTRA) Radio Resource Control (RRC)," Dec. 2007, 56 pages.

International Search Report issued in PCT/JP2009/055501, mailed on Apr. 28, 2009, with translation, 3 pages.

Written Opinion issued in PCT/JP2009/055501, mailed on Apr. 28, 2009, 3 pages.

Office Action for Japanese Patent Application No. 2008-074615 mailed Apr. 24, 2012, with English translation thereof (4 pages).

Patent Abstract for Japanese Publication No. 2008-061015 Published Mar. 13, 2008 (1 page).

Patent Abstract for Japanese Publication No. 2006-262178 Published Sep. 28, 2006 (1 page).

Office Action for Japanese Patent Application No. 2008-074615 mailed Sep. 11, 2012, with English translation thereof (6 pages).

* cited by examiner

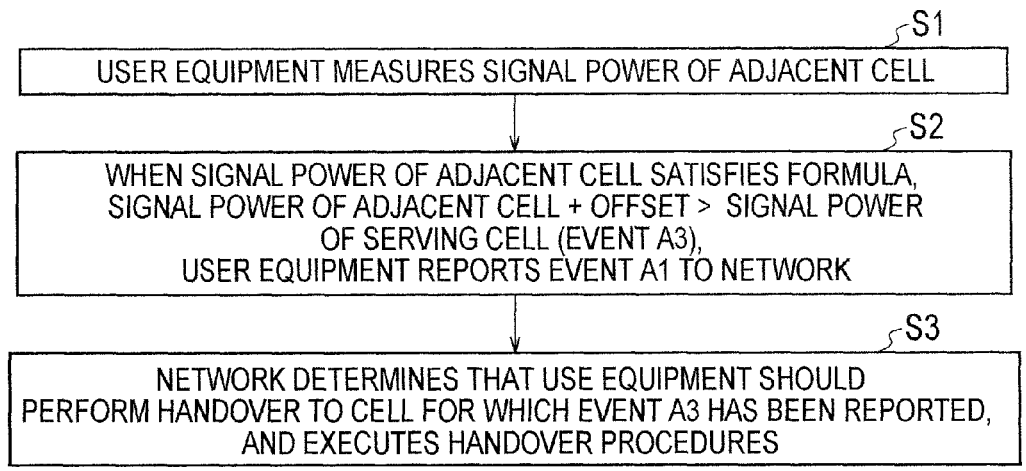
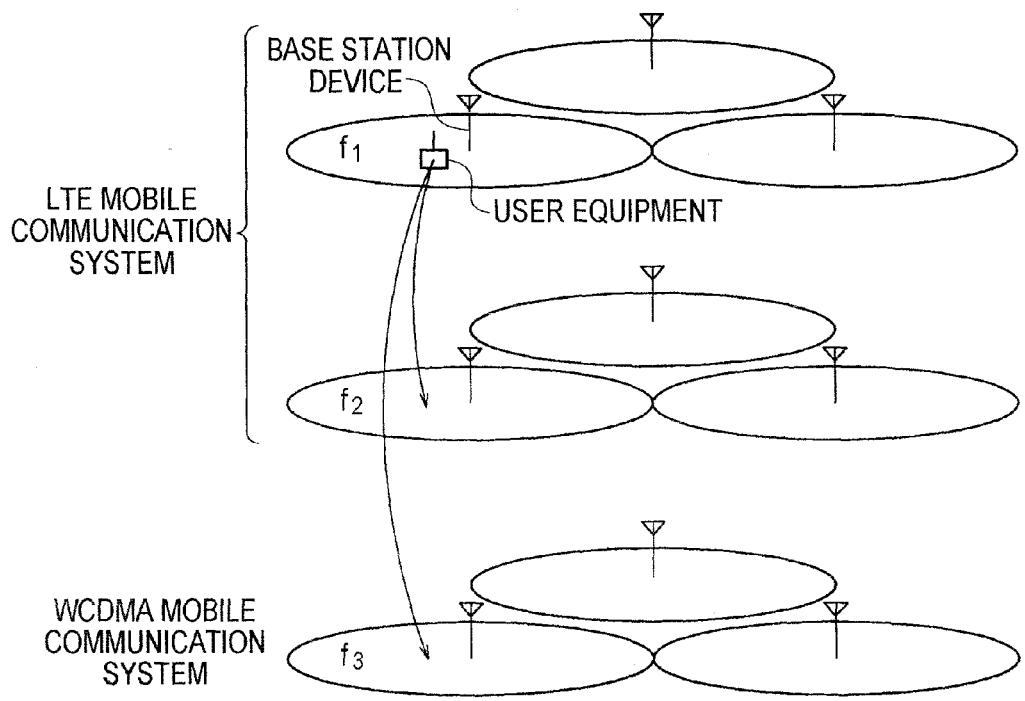

USER EQUIPMENT, BASE STATION DEVICE, AND MOBILE COMMUNICATION METHOD

TECHNICAL FIELD

The present invention relates to a user equipment configured to communicate with a base station device, a base station device configured to communicate with a user equipment, and a mobile communication method for performing communications between a user equipment and a base station device.

BACKGROUND ART

A mobile communication system having multiple cells continues communications by switching serving cells when a user equipment (UE) moves from a region in one cell to a region in another cell. This switching of serving cells is called a "handover."

Generally, when the user equipment moves to an adjacent cell and a signal from the adjacent cell becomes stronger than a signal from the serving cell, a handover to the adjacent cell is performed.

For example, the user equipment performs a handover according to the procedures shown in FIG. 1.

In Step S1, the user equipment measures communication quality in the adjacent cell (signal power of the adjacent cell).

In Step S2, the user equipment checks if the communication quality in the adjacent cell (signal power of the adjacent cell) satisfies the following formula.

Signal Power of Adjacent Cell+Offset>Signal Power of Serving Cell

Then, when the above formula is satisfied, the user equipment reports the result (Event A3) to a base station device (network).

Such a report to the base station device is made through a "measurement report."

Note that the offset is a value provided to prevent a handover from the serving cell to the adjacent cell from frequently occurring at the cell boundary. The offset value may be either positive or negative. In order to prevent a handover from the serving cell to the adjacent cell from frequently occurring at the cell boundary, the offset value is generally set to negative in the above formula.

In Step S3, upon receipt of the measurement report about Event A3 described above, the base station device determines that the user equipment should perform a handover to the adjacent cell for which Event A3 described above has been reported, and executes the handover procedures.

In other words, the base station device sends a message instructing the user equipment UE to perform a handover, i.e., a handover command to the user equipment UE.

Here, Event A3 described above is an event about measurement of the adjacent cell having the same frequency as the serving cell.

Note that a long term evolution (LTE) system that succeeds a wideband code division multiple access (W-CDMA) system and a high speed downlink packet access (HSDPA) system uses a "reference signal received power (RSRP)" as one of the criteria (the signal powers from the adjacent cell and the serving cell in the above example) for determining whether or not to perform a handover.

Here, besides the RSRP, a "reference signal signal-to-interference ratio (RS-SIR)," an "E-UTRA carrier received signal strength indicator (RSSI)," a "reference signal received quality (RSRQ)" and the like may be used.

Incidentally, although a handover destination is the cell having the same frequency in the above example, the handover destination may be not only the cell having the same frequency in the same system but also a cell having a different frequency in the same system or a cell using a different radio access technology (RAT).

The cell using a different radio access technology generally has a frequency different from that of a handover source. Therefore, the frequency of the handover destination cell naturally differs from the frequency of the handover source cell.

FIG. 2 schematically shows how a handover is performed between cells having different frequencies. FIG. 2 shows an LTE mobile communication system including a mobile communication system using a first frequency f1 and a mobile communication system using a second frequency f2, and a W-CDMA mobile communication system using a third frequency f3 different from f1 and f2.

For example, in FIG. 2, the base station device can instruct the user equipment communicating with the mobile communication system using the first frequency f1 to perform measurement on cells of two layers, including a cell of the second frequency f2 and a cell of the third frequency f3.

Note that, in the following description, each of the frequencies, such as the first frequency f1, the second frequency f2 and the third frequency f3, is called a layer. Specifically, there are three layers in FIG. 2, which are first to third layers corresponding to the first, second and third frequencies f1, f2 and f3, respectively.

Generally, the user equipment includes only one radio signal processor and thus cannot simultaneously transmit and receive signals for the respective different frequencies.

For this reason, when performing measurement on the cell (different-frequency cell) having a frequency different from that of the cell (serving cell) in which the user equipment is located, the user equipment needs to resynchronize the frequency with that of the cell.

To be more specific, for example, the base station device uses an "RRC message," which controls measurement, to notify the user equipment of a "length of a gap period," a "cycle of gap periods," a "frequency of the different-frequency cell" and the like. In response, the user equipment performs different-frequency measurement (including processes of changing the frequency, acquiring a synchronization channel, measuring the communication quality, changing the frequency, and the like) in the designated gap period.

The "different-frequency measurement" in the present application is a concept covering not only searching for a different-frequency cell and measuring communication quality thereof, but also searching for a cell using a different RAT and measuring communication quality thereof.

For example, in FIG. 2, the base station device may specify, to the user equipment, the second frequency f2 layer and the third frequency f3 layer as the layers to be measured.

As described above, the user equipment performs measurement of the adjacent cell to perform a handover to a cell having the same frequency, a cell having a different frequency or a cell in a different system.

Such measurement is instructed by the network, more specifically, by the base station device. In other words, the user equipment performs measurement of the adjacent cell according to a "measurement configuration" provided by the base station device, and then reports to the base station device a result of measurement of communication quality in the adjacent cell.

Here, the "measurement configuration" is provided to the user equipment in an RRC_Connected state by individual signaling, e.g., an "RRC CONNECTION RECONFIGURATION MESSAGE."

As described above, the base station device can specify, to the user equipment, multiple layers as the layers to be measured. For example, referring to FIG. 2, the base station device can specify, to the user equipment, the second frequency f2 layer and the third frequency f3 layer as the layers to be measured.

In this case, the user equipment performs measurement of the second frequency f2 layer and measurement of the third frequency f3 layer in the gap period described above. As a measurement method for the layers, there are two methods as shown in FIG. 3: a method for serially performing measurement of the second frequency f2 layer and measurement of the third frequency f3 layer, and a method for performing such measurements in parallel.

When different-frequency measurements of the two layers are serially performed, the time required for the different-frequency measurements is twice as long as the time required for different-frequency measurement on one layer.

On the other hand, when different-frequency measurements of the two layers are performed in parallel, the measurements are performed slowly in terms of time. Accordingly, acquisition of the synchronization channel and measurement of the communication quality take longer compared with the case where the different-frequency measurement is performed on one layer. As a result, the time required for the different-frequency measurements is more than twice as long as the time required for different-frequency measurement on one layer.

In other words, in terms of the time required for the different-frequency measurements, there is an advantage that the time required for the different-frequency measurements can be shortened when the different frequency measurements of the two layers are serially performed as compared with when the different-frequency measurements of the two layers are performed in parallel.

Meanwhile, when the different-frequency measurements of the two layers are serially performed, the different-frequency measurement of the layer with a higher priority or the different-frequency measurement of the layer with a better communication quality is likely to be put off.

For example, suppose that the priority of the third frequency f3 layer is higher than the priority of the second frequency f2 layer in FIG. 3. In this case, the following event occurs. Specifically, when measurement of the second frequency f2 layer is performed before the third frequency f3 layer regardless of the priority, a handover to the second frequency f2 layer is first performed. Then, the measurement of the third frequency f3 layer is performed, and a handover to the third frequency f3 layer is performed.

DISCLOSURE OF THE INVENTION

The present invention has been made in consideration of the foregoing problem. An objective of the present invention is to provide a user equipment, a base station device and a mobile communication method, which are capable of realizing different-frequency measurement of multiple layers based on a priority of each layer by notifying the priority to the user equipment in an RRC_Connected state, and capable of realizing fast and high-quality different-frequency handover and different-RAT handover.

A first aspect of the present invention is summarized as a user equipment configured to communicate with a base station device, the equipment comprise a connection state processor unit configured to measure, in a connected state, communication quality in each of cells respectively belonging to two or more layers, on the basis of a first priority, to report the measurement result to the base station device, and to perform handover processing according to an instruction from the base station device, the first priority notified by a first control signal notified from the base station device, the connected state being where a radio link between the user equipment and the base station device is established and stand-by state processor unit configured to measure, in a stand-by state, communication quality in each of cells respectively belonging to two or more layers on the basis of a second priority, and to determine on the basis of the measurement result a cell for performing a stand-by, the second priority notified by a second control signal notified from the base station device.

In the first aspect, wherein the connection state processor unit and the stand-by state processor unit measure communication quality in a cell having a different frequency in the same system or a cell in a different system, as the communication quality in one of the cells respectively belonging to two or more layers.

In the first aspect, wherein the connection state processor unit and the stand-by state processor unit perform measurement of communication quality in a cell with a higher priority before measurement of communication quality in a cell with a lower priority.

In the first aspect, wherein the connected state is an RRC_Connected state, and the stand-by state is an Idle state.

In the first aspect, wherein the first priority is discarded when the user equipment transitions from the RRC_Connected state to the Idle state, and the second priority is discarded when the user equipment transitions from the Idle state to the RRC_Connected state.

A second aspect of the present invention is summarized as a base station device configured to communicate with a user equipment, the device comprise a handover processor unit configured to instruct the user equipment in a connected state to measure and report communication quality in each of cells respectively belonging to two or more layers, and configured to transmit a first control signal containing a first priority and to determine whether or not the user equipment needs to perform handover processing, on the basis of the communication quality in each of the cells respectively belonging to two or more layers, the communication quality measured by the user equipment on the basis of the first priority, the connected state being where a radio link between the user equipment and the base station device is established and a stand-by cell search processor unit configured to transmit a second control signal to the user equipment in the stand-by state, the second control signal containing a second priority and being used to measure communication quality in each of cells respectively belonging to two or more layers and to determine a cell for performing a stand-by.

In the second aspect, wherein communication quality in a cell having a different frequency in the same system or a cell in a different system is measured as the communication quality in one of the cells respectively belonging to two or more layers.

In the second aspect, wherein the connected state is an RRC_Connected state, and the stand-by state is an Idle state.

In the second aspect, wherein the first priority is discarded when the user equipment transitions from the RRC_Connected state to the Idle state, and the second priority is discarded when the user equipment transitions from the Idle state to the RRC_Connected state.

A third aspect of the present invention is summarized as a mobile communication method for performing communications between a user equipment and a base station device, the method comprise transmitting from the base station device a first control signal instructing the user equipment in a connected state to measure and report communication quality in each of cells respectively belonging to two or more layers, the connected state being where a radio link between the user equipment and the base station device is established, transmitting a first control signal from the base station device to the user equipment in a connected state where a radio link between the user equipment and the base station device is established, the first control signal instructing the user equipment to measure and report communication quality in each of cells respectively belonging to two or more layers, measuring by the user equipment in the connected state the communication quality on the basis of a first priority notified by the first control signal notified from the base station device, and reporting from the user equipment the measurement result to the base station device, the communication quality being in each of the cells respectively belonging to two or more layers, determining by the base station device on the basis of the communication quality, which is in each of the cells respectively belonging to two or more layers and is notified by the user equipment, whether or not the user equipment needs to perform handover processing, transmitting a second control signal from the base station device to a user equipment in a stand-by state and measuring by the user equipment in the stand-by state, on the basis of the second priority notified by the second control signal notified from the base station device, communication quality in each of cells respectively belonging to two or more layers, and determining on the basis of the measurement result a cell for performing a stand-by.

BRIEF DESCRIPTION OF THE DRAWINGS

FIG. 1 is a flowchart showing a handover operation in a typical mobile communication system.

FIG. 2 is a diagram for illustrating a different-frequency handover and a different-RAT handover in a typical mobile communication system.

BEST MODE FOR CARRYING OUT THE INVENTION

Figure 3A:
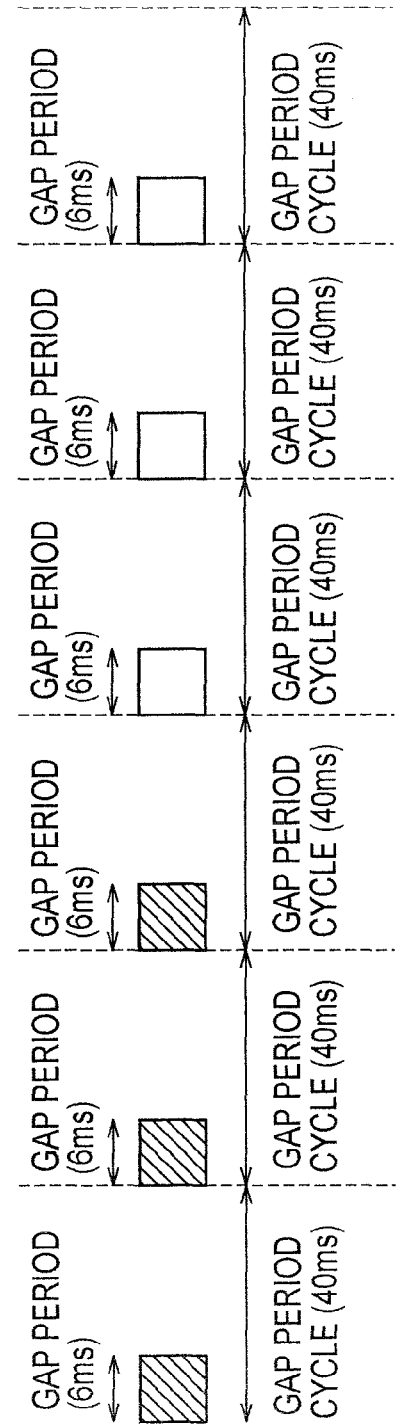
FIG. 3 is a diagram for illustrating measurement during a handover process in a typical mobile communication system.
Figure 3B:
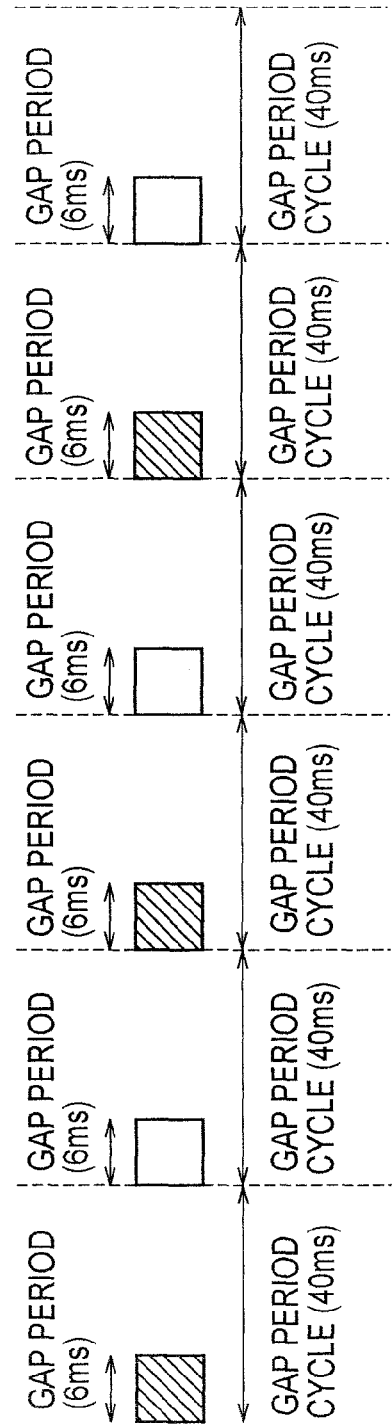

Configuration of Mobile Communication System According to First Embodiment of the Invention With reference to FIGS. 4 to 10, a configuration of a mobile communication system according to a first embodiment of the present invention is described. Note that throughout the drawings for illustrating the mobile communication system according to this embodiment, components having the same functions are denoted by the same reference numerals and redundant description is omitted.

Figure 4:
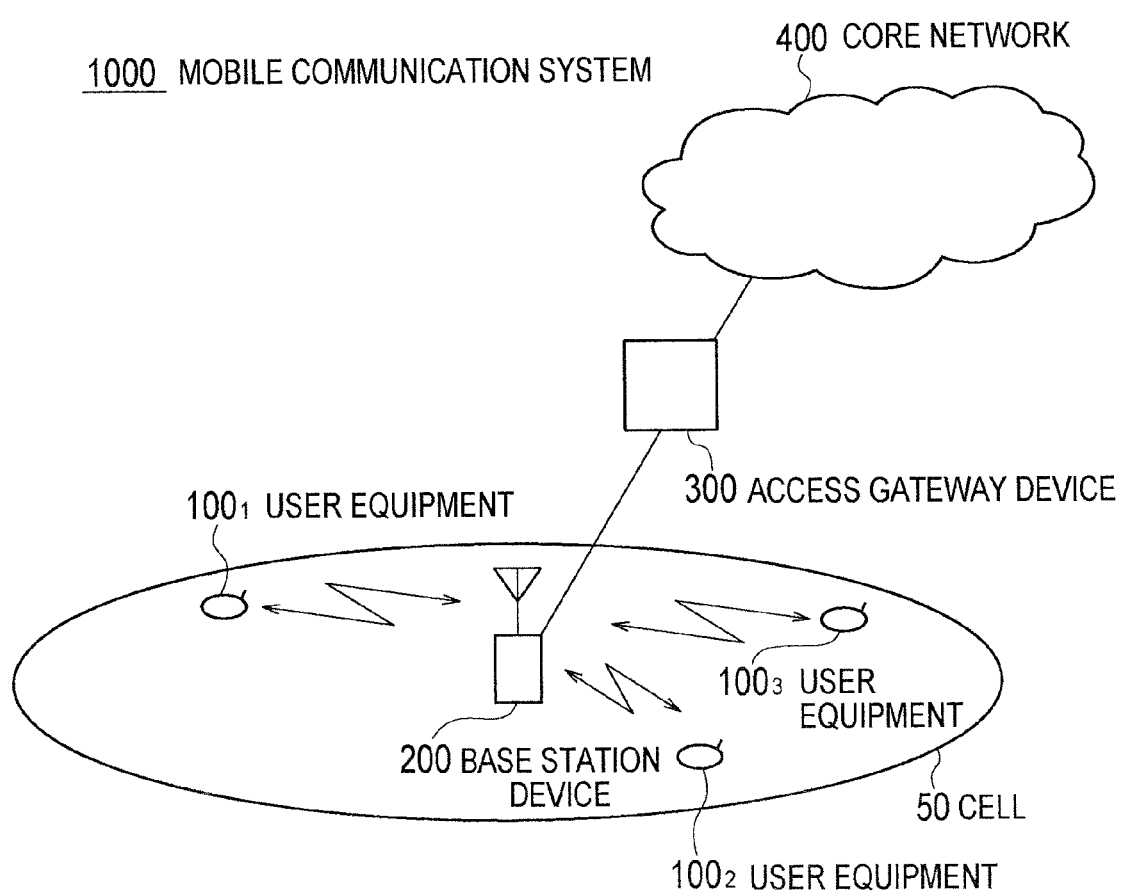
FIG. 4 is an overall configuration diagram of a mobile communication system according to a first embodiment of the present invention.

As shown in FIG. 4, a mobile communication system 1000 is, for example, a system employing the "long term evolution (LTE), Evolved UTRA and UTRAN or Super 3G".

The mobile communication system 1000 includes a base station device (eNB: eNode-B) 200 and multiple user equipments (UEs) 1001, 1002, 1003, . . . 100n (n is an integer greater than 0).

The base station device 200 is connected to a higher-level station, e.g., an access gateway device 300. The access gateway device 300 is connected to a core network 400. The access gateway device may be called a mobility management entity/serving gateway (MME/SGW).

Here, the user equipment 100n is configured to communicate with the base station device 200 by using the LTE within a cell 50.

The user equipments 1001, 1002, 1003, . . . 100n have the same configuration, functions and state, and thus are described below as the user equipment 100n unless otherwise noted. It is assumed that the user equipment 100n is a mobile terminal and a stationary terminal.

In the mobile communication system 1000, as radio access schemes, orthogonal frequency division multiple access (OFDMA) is employed in the downlink, and single carrier frequency division multiple access (SC-FDMA) is employed in the uplink.

The OFDMA is a scheme for dividing a frequency band into multiple narrow frequency bands (subcarriers) and transmitting data on each frequency band. The OFDMA can realize high-speed transmission and improve frequency use efficiency by closely arranging the subcarriers in such a manner that the subcarriers do not interfere with each other although the subcarriers partially overlap with each other on the frequency.

The SC-FDMA is a transmission scheme capable of reducing interference among the multiple user equipments by dividing a frequency band and performing transmissions among the user equipments using different frequency bands. The SC-FDMA has a feature of reducing a change in transmission power, and thus can realize low power consumption and wide coverage of each mobile station.

Here, a communication channel in the LTE scheme is described.

In the downlink, a "physical downlink shared channel (PDSCH)" and a "physical downlink control channel (PDCCH)" are used. The PDSCH is shared among the user equipments 100n, and the PDCCH is for transmitting a downlink control signal.

In other words, in the LTE scheme, a downlink channel is configured of the "physical downlink shared channel (PDSCH)" and the "physical downlink control channel (PDCCH)."

To be more specific, information notified by the "physical downlink control channel (PDCCH)" in the downlink includes: "user information" and "transport format information" regarding the "physical downlink shared channel (PDSCH);" "user information" and "transport format information" regarding a "physical uplink shared channel (PUSCH);" "delivery confirmation information (HARQ ACK information) on the physical uplink shared channel (PUSCH);" and the like. Also, user data is transmitted by the "physical downlink shared channel (PDSCH)." Note that, the delivery confirmation information (HARQ ACK information) may be transmitted by a physical HARQ indicator channel (PHICH) instead of the PDCCH.

Note that a transport channel mapped onto the "physical downlink shared channel (PDSCH)" is a "downlink shared channel (DL-SCH)."

Moreover, the "user information" and "transport format information" regarding the "physical downlink shared channel (PDSCH)" are called "downlink scheduling information."

Furthermore, the "user information" and "transport format information" regarding the "physical uplink shared channel (PUSCH)" are called "uplink scheduling grant."

These "downlink scheduling information" and "uplink scheduling grant" may be collectively called "downlink control information (DCI)."

Furthermore, in the downlink, a "downlink reference signal (DL_RS)" is transmitted as a pilot signal.

For example, the "downlink reference signal" is used by the user equipment 100n to perform channel estimation and measurement of radio quality in the downlink.

Figure 5:
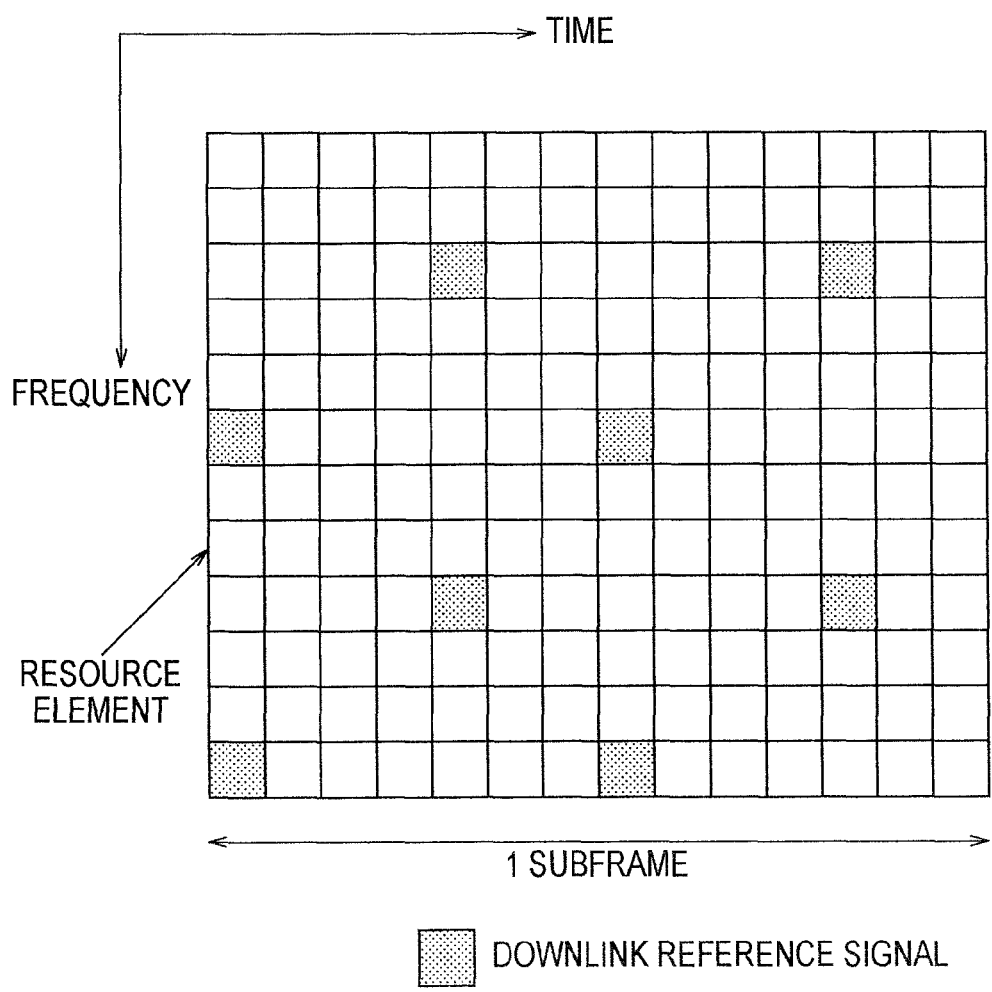
FIG. 5 is a diagram showing an example of mapping of a downlink reference signal in the first embodiment of the present invention.

FIG. 5 shows a method for mapping the "downlink reference signal." As shown in FIG. 5, in the LTE scheme, the "downlink reference signal" is mapped onto first, fifth, eighth and twelfth OFDM symbols within one subframe, and is mapped at a rate of one in every six subcarriers in a frequency direction.

On the other hand, in the uplink, the "physical uplink shared channel (PUSCH)" shared among the user equipments 100n, and an "uplink control channel for LTE" are used.

In other words, in the LTE scheme, an uplink channel is configured of the "physical uplink shared channel (PUSCH)" and the "uplink control channel for LTE."

To be more specific, information transmitted by the "uplink control channel for LTE" in the uplink includes: "downlink channel quality indicator (CQI)" to be used for "scheduling" and "adaptive modulation and coding scheme (AMCS)" in the "downlink shared channel (DL-SCH);" and "delivery confirmation information (HARQ ACK information) on the physical downlink shared channel (PDSCH)." Also, user data is transmitted by the "physical uplink shared channel (PUSCH)."

Note that a transport channel mapped onto the "physical uplink shared channel (PUSCH)" is an "uplink shared channel (UL-SCH)." In other words, the user data is mapped onto the "uplink shared channel (UL-SCH)."

Here, the user data is, for example, an IP packet in Web browsing, FTP, VoIP or the like, a control signal for "radio resource control (RRC) processing" or the like, and is also called packet data.

Furthermore, the user data is mapped onto a "dedicated traffic channel (DTCH)" or a "dedicated control channel (DCCH)", for example, as a logical channel.

Next, the user equipment 100n according to the first embodiment is described with reference to FIG. 6.

Figure 6:
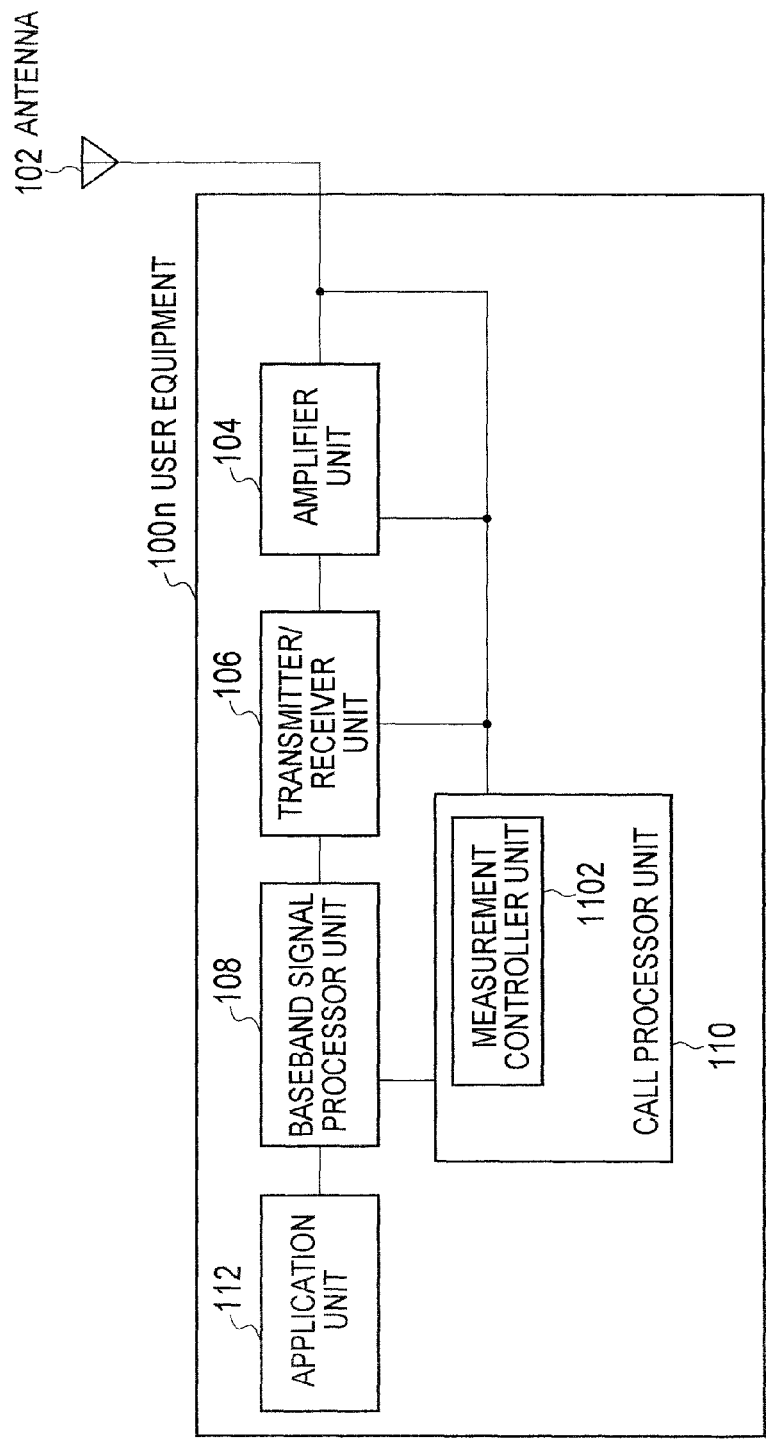
FIG. 6 is a functional block diagram of a user equipment according to the first embodiment of the present invention.

As shown in FIG. 6, the user equipment 100n includes an antenna 102, an amplifier 104, a transmitter/receiver 106, a baseband signal processor 108, a call processor 110 and an application unit 112.

The antenna 102 is configured to receive a downlink signal transmitted by the base station device 200.

The amplifier 104 is configured to amplify the downlink signal (radio frequency signal) received by the antenna 102.

The transmitter/receiver 106 is configured to convert the radio frequency signal amplified by the amplifier 104 into a baseband signal by frequency conversion.

Here, the antenna 102, the amplifier 104 and the transmitter/receiver 106 may be configured to change the frequency of the received downlink signal when instructed to do so by a measurement controller 1102.

For example, when performing "inter-frequency measurements" or "inter-RAT measurement," the measurement controller 1102 notifies the antenna 102, the amplifier 104 and the transmitter/receiver 106 of the frequency of a layer to be measured in the measurements. In response, the antenna 102, the amplifier 104 and the transmitter/receiver 106 perform processing of switching the frequency of the received downlink signal to the notified frequency.

The baseband signal processor 108 is configured to perform FFT processing or reception processing such as error correction decoding on the baseband signal received from the transmitter/receiver 106.

The baseband signal processor 108 is configured to also measure communication quality in an adjacent cell, i.e., to perform "measurement" using a downlink reference signal, as described later.

Note that the "measurement" may be, for example, "intra-frequency measurement" for measurement of cells of the same frequency, "inter-frequency measurement" for measurement of cells of different frequencies, or "inter-RAT measurement" for measurement of cells in different systems.

The application unit 112 is configured to input user data for uplink to the baseband signal processor 108. Note that, the application unit 112 is configured to perform processing and the like for layers higher than a physical layer, a MAC layer, an RLC layer and a PDCP layer.

The baseband signal processor 108 is configured to transfer the user data to the transmitter/receiver 106 after performing dividing and combining processing, transmission processing in the RLC layer, such as radio link control (RLC) retransmission control, transmission processing in the MAC layer, such as hybrid ARQ (H-ARQ) retransmission control, channel coding processing, DFT processing, IFFT processing, and the like.

The measurement controller 1102 in the call processor 110 is configured to transmit, when determining to transmit a "measurement report" to the base station device 200, the "measurement report" to the baseband signal processor 108 (an RLC processor 1089).

The baseband signal processor 108 is configured to transfer the "measurement report," as with the user data described above, to the transmitter/receiver 106 after performing dividing and combining processing, transmission processing in the RLC layer, such as RLC retransmission control, transmission processing in the MAC layer, such as H-ARQ retransmission control, channel coding processing, DFT processing, IFFT processing, and the like.

Note that, the "measurement report" is mapped onto a "dedicated control channel (DCCH)," for example, as a logical channel.

The transmitter/receiver 106 is configured to convert the baseband signal received from the baseband signal processor 108 into a radio frequency signal by frequency conversion.

The amplifier 104 is configured to amplify the radio frequency signal inputted by the transmitter/receiver 106 and to transmit the amplified signal through the antenna 102.

Figure 7:
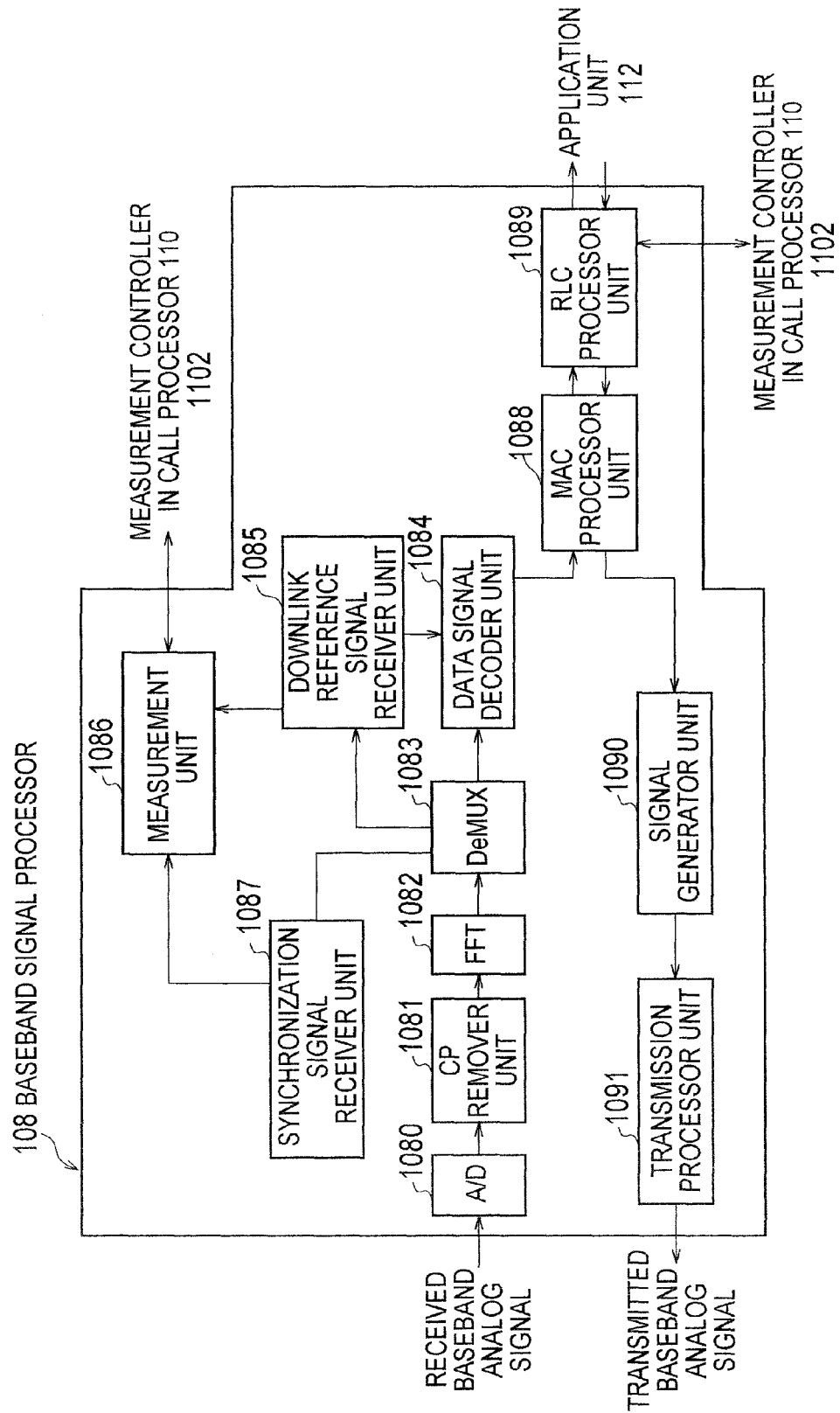
FIG. 7 is a functional block diagram of a baseband signal processor in the user equipment according to the first embodiment of the present invention.

Here, with reference to FIG. 7, the configuration of the baseband signal processor 108 is described in more detail.

The baseband signal processor 108 includes an analog/digital converter (A/D) 1080, a CP remover 1081, a fast Fourier transformer (FFT) 1082, a demultiplexer (DeMUX) 1083, a data signal decoder 1084, a downlink reference signal receiver 1085, a measurement unit 1086, a synchronization signal receiver 1087, a MAC processor 1088, the RLC processor 1089, a signal generator 1090 and a transmission processor 1091.

The analog/digital converter (A/D) 1080 is configured to convert the baseband signal (analog signal) inputted by the transmitter/receiver 106 into a digital signal, and to input the digital signal to the CP remover 1081.

The CP remover 1081 is configured to obtain an effective symbol portion by removing a "cyclic prefix (CP)" from a received symbol, and to input the effective symbol portion to the fast Fourier transformer (FFT) 1082.

The fast Fourier transformer (FFT) 1082 is configured to perform fast Fourier transform on the signal inputted by the CP remover 1081, then perform OFDM demodulation thereon, and then input the demodulated signal to the demultiplexer (DeMUX) 1083.

The demultiplexer (DeMUX) 1083 is configured to separate the signal inputted by the fast Fourier transformer (FFT) 1082 into a downlink reference signal and a data signal, and to input the separated downlink reference signal to the downlink reference signal receiver 1085 and the separated data signal to the data signal decoder 1084.

The demultiplexer (DeMUX) 1083 is configured to also separate a synchronization signal from the signal inputted by the fast Fourier transformer (FFT) 1082, and to input the separated synchronization signal to the synchronization signal receiver 1087.

Note that the synchronization signal may be separated from the signal inputted by the fast Fourier transformer (FFT) 1082 as described above, or may be separated from the signal that has been processed by the analog/digital converter (A/D) 1080.

The downlink reference signal receiver 1085 is configured to perform channel estimation based on the downlink reference signal inputted by the demultiplexer (DeMUX) 1083, and to determine what kind of channel compensation needs to be performed on the received data signal, i.e., to calculate a channel estimated value.

The downlink reference signal receiver 1085 is configured to also input the calculated channel estimated value to the data signal decoder 1084.

The downlink reference signal receiver 1085 is configured to further input the downlink reference signal and the channel estimated value to the measurement unit 1086.

Note that when "inter-frequency measurement" is performed, the frequency of the downlink signal inputted to the baseband signal processor 108 is changed through the antenna 102, the amplifier 104 and the transmitter/receiver 106 as described above.

Accordingly, the downlink reference signal receiver 1085 is configured to notify the measurement unit 1086 of a signal of the layer to be subjected to "inter-frequency measurement," together with the downlink reference signal and the channel estimated value.

The data signal decoder 1084 is configured to compensate for the data signal on the basis of the channel estimated value inputted from the downlink reference signal receiver 1085, and to decode the data signal transmitted by the base station device 200.

Here, the data signal means a signal transmitted by the base station device 200 through a "broadcast channel," a "downlink shared channel (DL-SCH)" or a "downlink control channel."

Also here, the "broadcast channel" means, more specifically, a "physical broadcast channel (P-BCH)" or a "dynamic broadcast channel (D-BCH)."

Moreover, the signal transmitted through the "downlink control channel" means the "downlink scheduling information," the "uplink scheduling grant," the "delivery confirmation information on the uplink shared channel" or the like, which is mapped onto the "physical downlink control channel (PDCCH)."

The data signal decoder 1084 is configured to input the decoded data signal to the MAC processor 1088.

The data signal decoder 1084 is configured to also acquire information contained in the "physical broadcast channel (P-BCH)" or the "dynamic broadcast channel (D-BCH)," and to notify the acquired information to the respective units in the user equipment 100n as needed.

Note that a "measurement configuration" contained in the data signal is configured to be sent to the measurement controller 1102 in the call processor 110 through the MAC processor 1088 and the RLC processor 1089.

The measurement unit 1086 is configured to measure communication quality in the adjacent cell on the basis of the "downlink reference signal" and the "channel estimated value" which are inputted from the downlink reference signal receiver 1085.

In other words, the measurement unit 1086 is configured to perform "intra-frequency measurement" for measurement of cells of the same frequency or "inter-frequency measurement" for measurement of cells of different frequencies.

For example, the measurement unit 1086 may be configured to measure, as the communication quality in the adjacent cell, an RSRP, an RSSI, an RSRQ, a pathloss, an RS-SIR or the like.

The "inter-frequency measurement" of two or more layers having different frequencies is described below.

Figure 8:
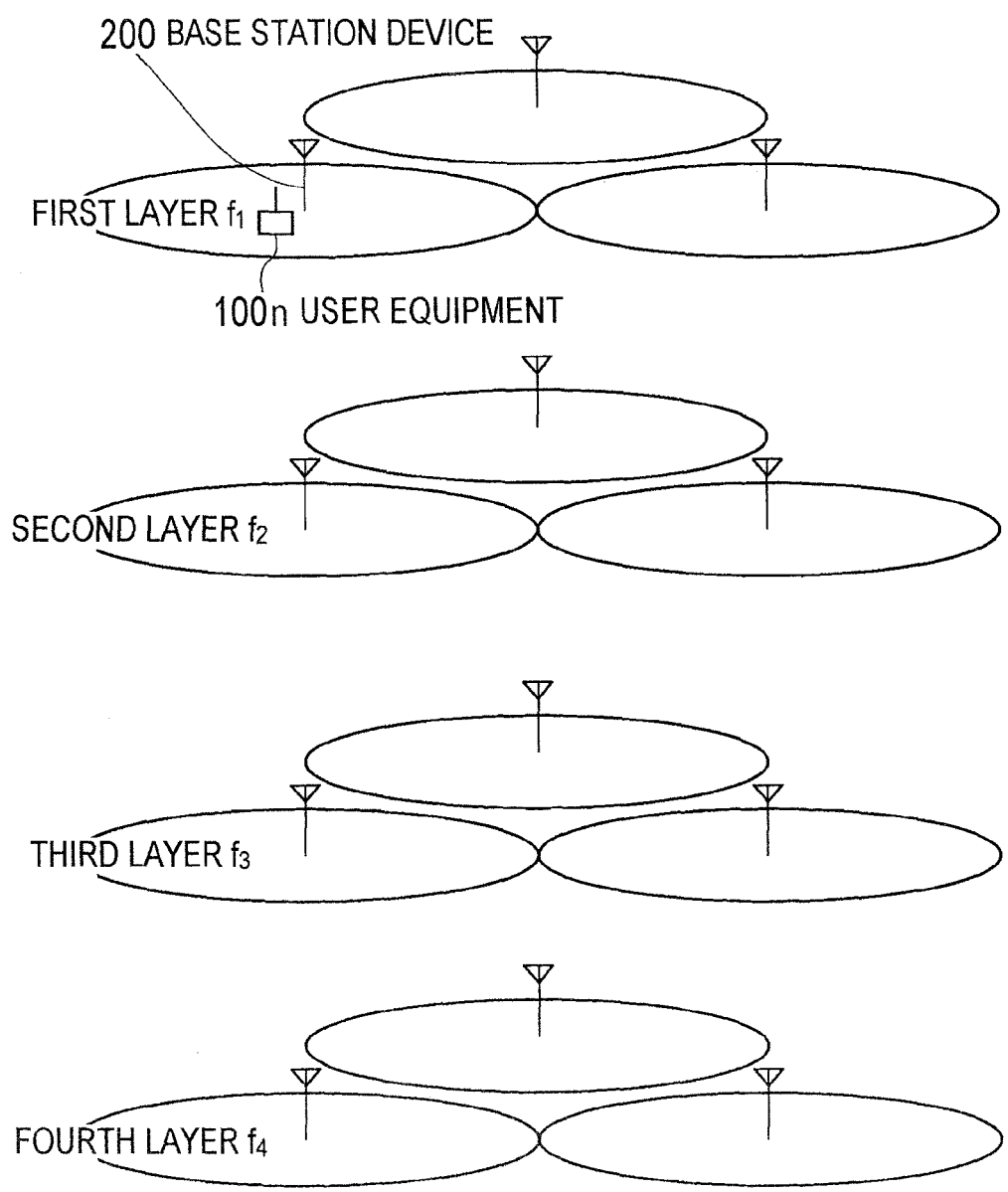
FIG. 8 is a diagram for illustrating a connection configuration of the user equipment according to the first embodiment of the present invention.

As shown in FIG. 8, a case is considered where the user equipment 100n communicates with the base station device 200 in a first layer, and the base station device 200 instructs the user equipment 100n to perform "measurements" of second, third and fourth layers.

Here, priorities are assumed to be given to the second to fourth layers, respectively.

To be more specific, the highest priority is given to the second layer, the second highest priority is given to the third layer, and the third highest priority is given to the fourth layer.

Note that the priorities given to the respective layers may be contained in the "measurement configuration," for example.

In other words, the base station device 200 may use the "measurement configuration" to notify the user equipment 100n of the priority of each layer.

In this event, the measurement unit 1086 is configured to perform firstly, an "inter-frequency measurement" of the second layer, secondly, an "inter-frequency measurement" of the third layer, and thirdly, an "inter-frequency measurement" of the fourth layer.

In other words, the measurement unit 1086 is configured to perform the "inter-frequency measurements" of the layers in descending order of priority.

Note that the "inter-frequency measurement" also includes processing of acquiring a synchronization signal by the synchronization signal receiver 1087 to be described later.

To be more specific, the measurement unit 1086 may be configured to change on the basis of the priority described above the frequency to be measured in "measurement gaps (gap period)" managed by the measurement controller 1102 to be described later.

In other words, the measurement unit 1086 may be configured to determine on the basis of the priority of each layer the frequency to be measured in the "measurement gaps (gap period)," and then perform the "inter-frequency measurements."

Note that the measurement unit 1086 and the measurement controller 1102 may be configured to transmit a "measurement report" as needed to the base station device 200 when the conditions for transmitting the "measurement report" are met even if the measurements of all the layers are not finished.

As a result, a "measurement report" on the high-priority layer is transmitted to the base station device 200 from the user equipment 100*n* without waiting for the measurement of the low-priority layer to be finished.

Note that the measurements of two or more layers are all "inter-frequency measurements" in the above example, but may include an "inter-RAT measurement".

In this case, the user equipment 100*n* includes a baseband signal processor for the RAT, and performs a "measurement" about the RAT.

Moreover, the synchronization signal receiver 1087 is configured to acquire a synchronization signal of an adjacent cell, i.e., a peripheral cell by using a downlink synchronization signal, and to acquire an ID of the cell.

Note that when "inter-frequency measurement" is performed, the frequency of the downlink signal inputted to the baseband signal processor 108 is changed through the antenna 102, the amplifier 104 and the transmitter/receiver 106 as described above. Accordingly, the synchronization signal receiver 1087 is configured to acquire a synchronization signal of a cell in the layer to be subjected to the "inter-frequency measurement."

The MAC processor 1088 is configured to receive the "downlink scheduling information," the "uplink scheduling grant," the "delivery confirmation information on the uplink shared channel (UL-SCH)" and the like, which are decoded by the data signal decoder 1084.

The MAC processor 1088 is configured to also determine a transmission format of user data for uplink, and perform transmission processing such as HARQ retransmission control in the MAC layer on the basis of the received "uplink scheduling grant."

Specifically, the MAC processor 1088 is configured to determine a transmission format and perform transmission processing such as HARQ retransmission control for user data in a data buffer in the user equipment 100*n*, and then input the user data to the signal generator 1090 upon issuance of an instruction through the "uplink scheduling grant" from the base station device 200 to perform communications using the "uplink shared channel (UL-SCH)," the "uplink scheduling grant" inputted from the data signal decoder 1084.

In addition, for the downlink, the MAC processor 1088 is configured to further perform reception processing of MAC retransmission control, and the like on user data for downlink on the basis of the "downlink scheduling information" received from the data signal decoder 1084, for example.

The RLC processor 1089 is configured to perform, for the uplink, dividing and combining processing and transmission processing in the RLC layer, such as transmission processing of RLC retransmission control, on the user data. The RLC processor 1089 is also configured to perform, for the downlink, dividing and combining processing and reception processing in the RLC layer, such as reception processing of RLC retransmission control, on the user data.

Note that the RLC processor 1089 may be configured to further perform processing in the PDCP layer.

The RLC processor 1089 is configured to also notify the call processor 110 of the information contained in "broadcast information" or an "RRC message" transmitted by the base station device 200.

The signal generator 1090 is configured to perform signal generation processing, e.g., processing such as coding and data modulation on an "uplink shared signal," a "sounding RS" or an "uplink control signal," to be transmitted via uplink e.g., "downlink channel quality indicator (CQI)," "delivery confirmation information on the downlink shared channel (DL-SCH)," a "preamble signal for random access (random access channel signal)" and the like. The signal generator 1090 is configured to then transmit the processed signal to the transmission processor 1091.

The transmission processor 1091 is configured to perform transmission processing such as DFT processing, IFFT processing or CP insertion processing on the signal inputted from the signal generator 1090.

The call processor 110 includes the measurement controller 1102. The call processor 110 is configured to perform call processing such as setting, handover and release for the communication channel, and to manage the state of the user equipment 100*n*.

For example, the call processor 110 is configured to receive the "broadcast information" or the "RRC message" transmitted from the base station device 200, and to notify the information contained in the "broadcast information" or the "RRC message" to the respective units in the user equipment 100*n* as needed.

Processing performed by the measurement controller 1102 in the call processor 110 is described below.

The measurement controller 1102 is configured to control and manage the "measurement" in the user equipment 100*n*.

To be more specific, the measurement controller 1102 is configured to manage and control the "measurement" on the basis of the "measurement configuration" transmitted by the base station device 200.

Parameters included in the "measurement configuration" are listed below as an example.

A "measurement type" is a parameter indicating a type of measurement. Specifically, the types set in the "measurement type" include: "intra-frequency measurement" for measurement of cells of the same frequency; "inter-frequency measurement" for measurement of cells of different frequencies; "inter-RAT measurement of UTRA frequencies" for measurement of UTRA cells; "inter-RAT measurement of GERAN frequencies" for measurement of GSM cells; and the like.

"Measurement objects" are parameters related to objects of measurement. To be more specific, a frequency to be measured, a cell ID and the like, for example, are set in the "measurement objects."

"Reporting configurations" are parameters related to reports on measurement results. To be more specific, in the "reporting configurations," a reporting trigger such as reporting when an event occurs or reporting periodically, and a "hysteresis value" or a "time-to-trigger value" in the case of reporting when an event occurs or a reporting cycle in the case of reporting periodically or the like are set. Moreover, the "reporting configurations" may also include a parameter related to a reporting format such as the number of cells to be reported.

"Measurement identities" are parameters related to IDs for reference when reporting the measurement results.

"Quantity configurations" are parameters related to values to be measured, which correspond to the RSRP and RSRQ described above, for example. Moreover, the "quantity configurations" may also include parameters for filtering the measurement results.

"Measurement gaps" are parameters related to a gap period used by the user equipment 100n for measurement.

For example, the measurement controller 1102 is configured to notify the measurement unit 1086 of the "measurement configuration."

Here, when the priority of each layer in the "inter-frequency measurement" or the "inter-RAT measurement" is given to the "measurement configuration," the measurement controller 1102 is configured to notify the measurement unit 1086 of also the priority of each layer.

Note that the measurement controller 1102 may notify, using the "measurement configuration," not only the priority of the layer to be measured but also the priority of the layer in which the user equipment 100n is performing communications.

Moreover, the measurement controller 1102 is configured to manage gap information on the basis of the "measurement gaps" included in the "measurement configuration."

To be more specific, the measurement controller 1102 instructs the antenna 102, the amplifier 104 and the transmitter/receiver 106 to change the frequency of the received downlink signal in the gap period set on the basis of the "measurement gaps."

Here, the measurement controller 1102 is configured to determine the frequency of the received downlink signal on the basis of the priority of the layer to be measured, as described above.

In other words, the measurement controller 1102 is configured to determine the frequency of the received downlink signal so that "measurements" can be performed in descending order of priority from the cell belonging to the layer with the highest priority, and to notify the antenna 102, the amplifier 104 and the transmitter/receiver 106 of the determined frequency.

As described above, the user equipment 100n is configured to measure communication quality in each of the cells respectively belonging to two or more layers, on the basis of the first priority notified by the "measurement configuration (first control signal)" notified from the base station device 200 in an RRC_Connected state (connected state) where a radio link to the base station device 200 is established. In addition, the user equipment 100n is configured to then report the measurement result to the base station device 200, and to perform handover processing according to an instruction from the base station device 200.

To be more specific, the measurement controller 1102 is configured to notify the measurement unit 1086 of the first priority (priority of each layer) notified by the "measurement configuration (first control signal)" notified from the base station device 200.

The measurement unit 1086 is configured to measure the communication quality in each of the cells respectively belonging to two or more layers, i.e., to perform the "measurement" based on the first priority.

Then, the call processor 110 is configured to perform handover processing according to the instruction from the base station device 200.

The user equipment 100n is configured to also measure communication quality in each of the cells respectively belonging to two or more layers, on the basis of the second priority notified by a second control signal (e.g., broadcast information, an RRC message, etc.) notified from the base station device 200 in an Idle state (stand-by state), and to determine a cell for performing a stand-by based on the measurement result.

To be more specific, the measurement controller 1102 is configured to notify the measurement unit 1086 of the second priority (priority of each layer) notified by the "measurement configuration (second control signal)" notified from the base station device 200.

The measurement unit 1086 is configured to measure the communication quality in the cell belonging to two or more layers, i.e., to perform the "measurement" based on the second priority.

The call processor 110 is configured to determine the cell for performing a stand-by, i.e., to perform "cell reselection" based on the measurement result.

Here, the user equipment 100n is configured to perform measurement of communication quality in the cell with a higher priority before measurement of communication quality in the cell with a lower priority.

Moreover, the user equipment 100n (the measurement controller 1102) is configured to discard the first priority when transitioning from the RRC_Connected state to the Idle state, and to discard the second priority when transitioning from the Idle state to the RRC_Connected state.

Figure 9:
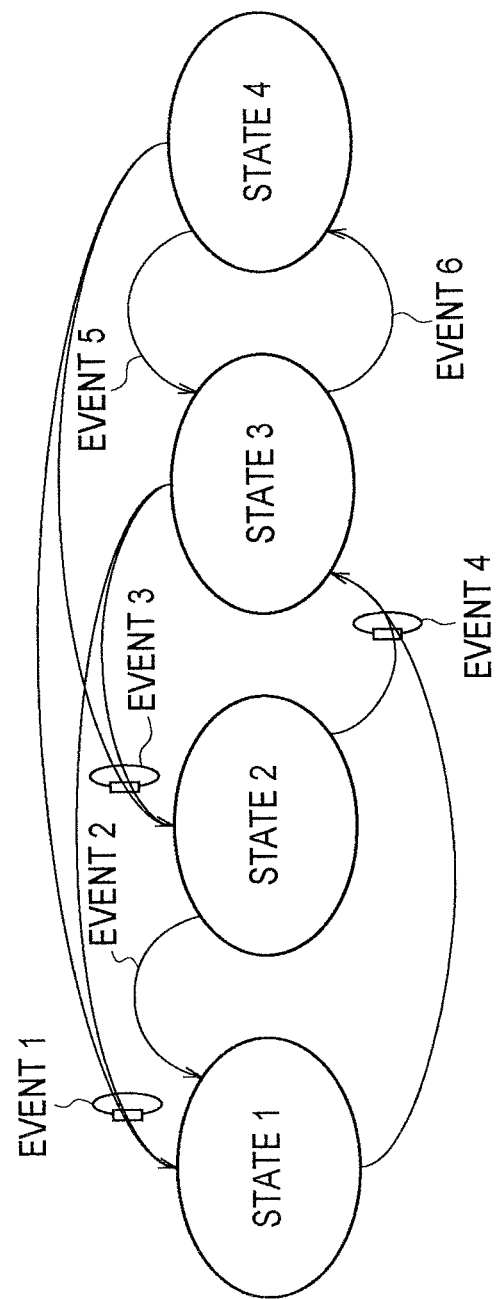
FIG. 9 is a diagram for illustrating a state change of the user equipment according to the first embodiment of the present invention.

Here, with reference to FIG. 9, an example of a state transition of the user equipment 100n is described more specifically.

In FIG. 9, state 1 is the Idle state of the user equipment 100n where the priority is notified by broadcast information (system information).

Moreover, state 2 is the Idle state of the user equipment 100n where the priority is notified by dedicated signaling.

Furthermore, state 3 is the RRC_Connected state of the user equipment 100n where no priority is notified.

Further, state 4 is the RRC_Connected state of the user equipment 100n where the priority is notified.

Here, when the RRC connection is released by an "RRC connection release" including no priority in state 3 and state 4 (event 1), the state of the user equipment 100n transitions to state 1.

Moreover, when a predetermined timer expires or when the user equipment 100n moves to another PLMN (event 2) in state 2, the state of the user equipment 100n transitions to state 1.

Further, when the RRC connection is released by an "RRC connection release" including a priority in state 3 or state 4 (event 3), the state of the user equipment 100n transitions to state 2.

When an RRC connection is set (event 4) in state 1 and state 2, the state of the user equipment 100n transitions to state 3.

In addition, when an "RRC connection reconfiguration" for deleting the priority is received, when a predetermined timer expires or when the user equipment 100n moves to another PLMN (event 5) in state 4, the state of the user equipment 100n transitions to state 3.

Furthermore, when an "RRC connection reconfiguration" for adding the priority is received (event 6) in state 3, the state of the user equipment 100n transitions to state 4.

Next, a configuration of the base station device 200 is described with reference to FIG. 10.

Figure 10:
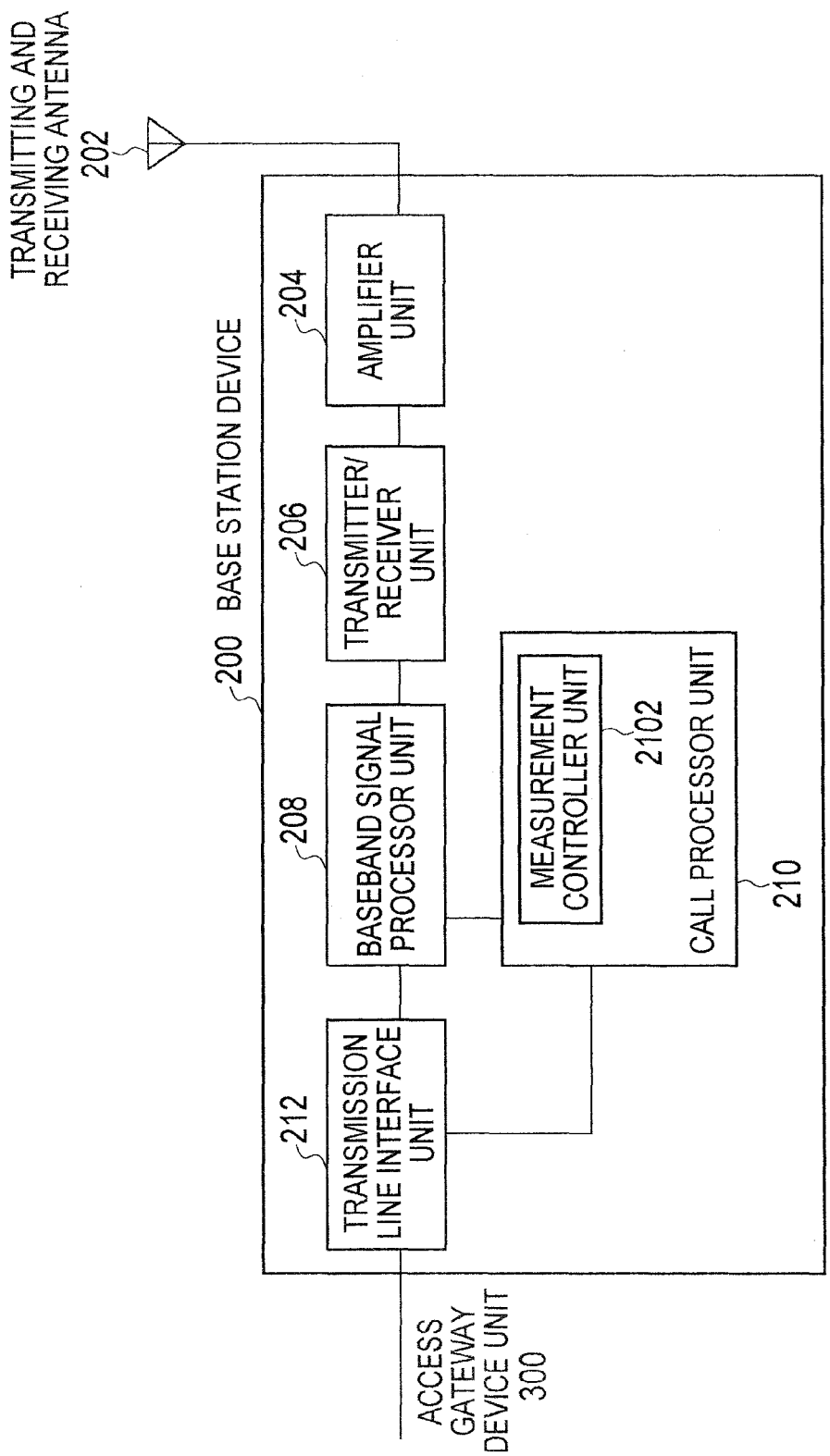
FIG. 10 is a functional block diagram of a base station device according to the first embodiment of the present invention.

As shown in FIG. 10, the base station device 200 includes a transmitting and receiving antenna 202, an amplifier 204, a transmitter/receiver 206, a baseband signal processor 208, a call processor 210 and a transmission line interface 212.

The transmitting and receiving antenna 202 is configured to transmit and receive an uplink signal and a downlink signal to and from the user equipment 100n.

The amplifier 204 is configured to amplify the uplink signal (radio frequency signal) received by the transmitting and receiving antenna 202 and the downlink signal (radio frequency signal) inputted by the transmitter/receiver 206.

The transmitter/receiver 206 is configured to convert the radio frequency signal amplified by the amplifier 204 into a baseband signal by frequency conversion. The transmitter/receiver 206 is configured to convert the baseband signal received from the baseband signal processor 208 into a radio frequency signal by frequency conversion.

The baseband signal processor 208 is configured to perform reception processing on a baseband signal inputted from the transmitter/receiver 206. Moreover, the baseband signal processor 208 is configured to perform transmission processing on user data received from a higher-level station through the transmission line interface 212, a "measurement configuration" received from a measurement controller 2102 in the call processor 210, and the like.

Here, the "measurement configuration" may be an RRC message, for example. More specifically, the "measurement configuration" may be an RRC message of "RRC connection reconfiguration."

The call processor 210 is configured to instruct the user equipment 100n in the RRC_Connected state to measure and report communication quality in each of cells respectively belonging to two or more layers, and to transmit a "measurement configuration (first control signal)" containing a first priority.

Moreover, the call processor 210 is configured to determine, on the basis of the communication quality ("measurement report") in each of the cells respectively belonging to two or more layers, whether or not the user equipment 100n needs to perform handover processing, the communication quality measured by the user equipment 100n based on the first priority.

Furthermore, the call processor 210 is configured to transmit to the user equipment 100n in the Idle state, the second control signal containing a second priority and used to measure the communication quality in each of the cells respectively belonging to two or more layers and to determine a cell for performing a stand-by.

Operations of Mobile Communication System According to First Embodiment of the Invention Operations of the mobile communication system according to the first embodiment of the present invention are described with reference to FIGS. 11 to 13.

First, operations of the user equipment 100n in the RRC_Connected state are described with reference to FIG. 11.

Figure 11:
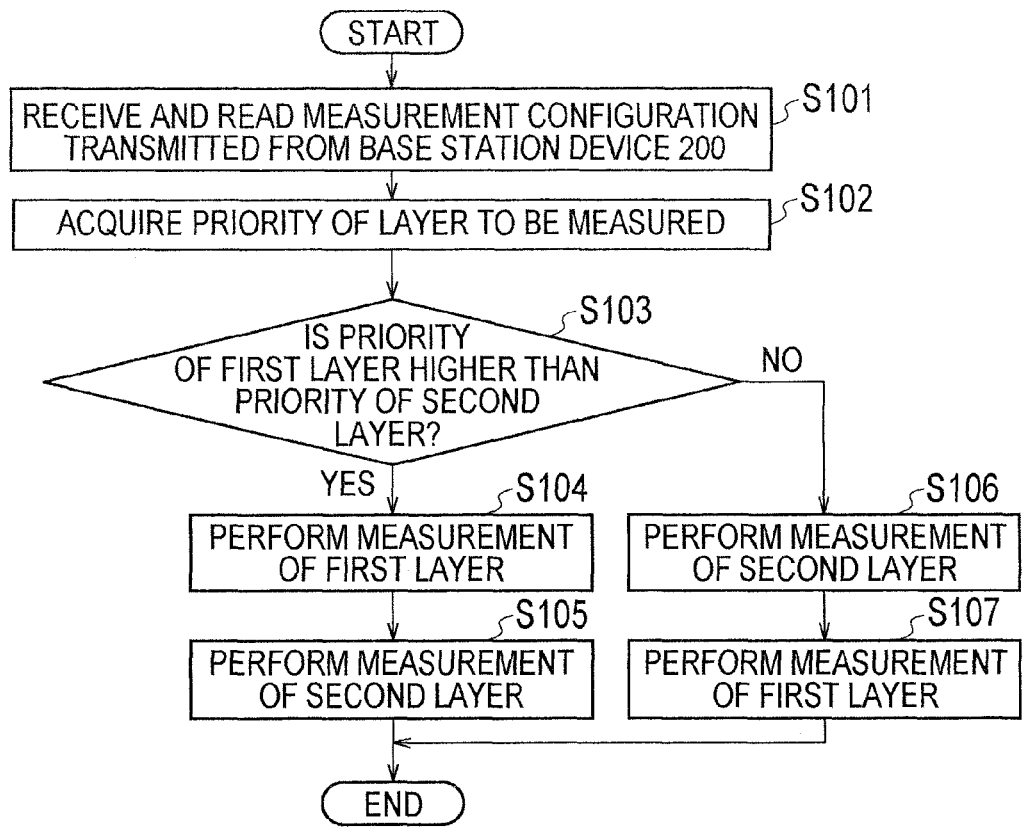
FIG. 11 is a flowchart showing operations of the user equipment according to the first embodiment of the present invention.

As shown in FIG. 11, in Step S101, the user equipment 100n receives the "measurement configuration (first control signal)" notified from the base station device 200.

In Step S102, the user equipment 100n acquires a priority (first priority) of the cell (cells belonging to the first and second layers in the example of FIG. 11) to be measured, which is set in the "measurement configuration."

Note that the priority may be set in "measurement objects" of the "measurement configuration" or may be set in another parameter.

In Step S103, a priority given to a cell belonging to the first layer is compared to a priority given to a cell belonging to the second layer.

When the priority given to the cell belonging to the first layer is higher than the priority given to the cell belonging to the second layer, the user equipment 100n performs measurement of the cell belonging to the first layer in Step S104 and then performs measurement of the cell belonging to the second layer in Step S105.

Meanwhile, when the priority given to the cell belonging to the second layer is higher than the priority given to the cell belonging to the first layer, the user equipment 100n performs measurement of the cell belonging to the second layer in Step S106 and then performs measurement of the cell belonging to the first layer in Step S107.

Second, operations of the user equipment 100n when transitioning from the RRC_Connected state to the Idle state are described with reference to FIG. 12.

Figure 12:
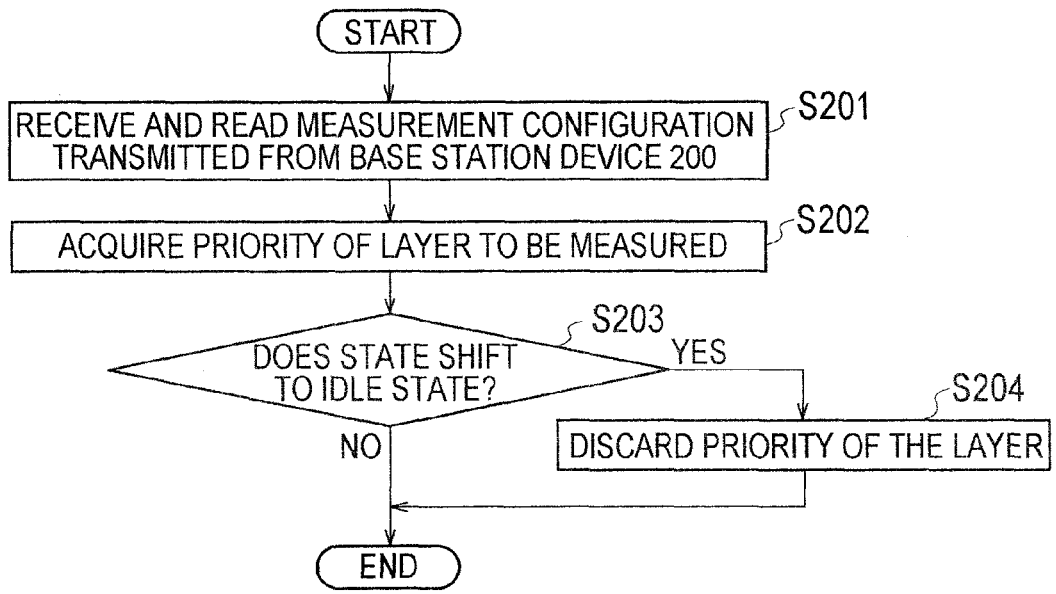
FIG. 12 is a flowchart showing operations of the user equipment according to the first embodiment of the present invention.

As shown in FIG. 12, in Step S201, the user equipment 100n receives the "measurement configuration (first control signal)" notified from the base station device 200.

In Step S202, the user equipment 100n acquires a priority (first priority) of each of the cells (cells respectively belonging to the first and second layers in the example of FIG. 12) to be measured, which is set in the "measurement configuration."

Thereafter, in Step S203, when the state of the user equipment 100n is determined to transition to the Idle state, the user equipment 100n discards the first priority described above in Step S204.

Third, operations of the base station device 200 are described with reference to FIG. 13.

Figure 13:
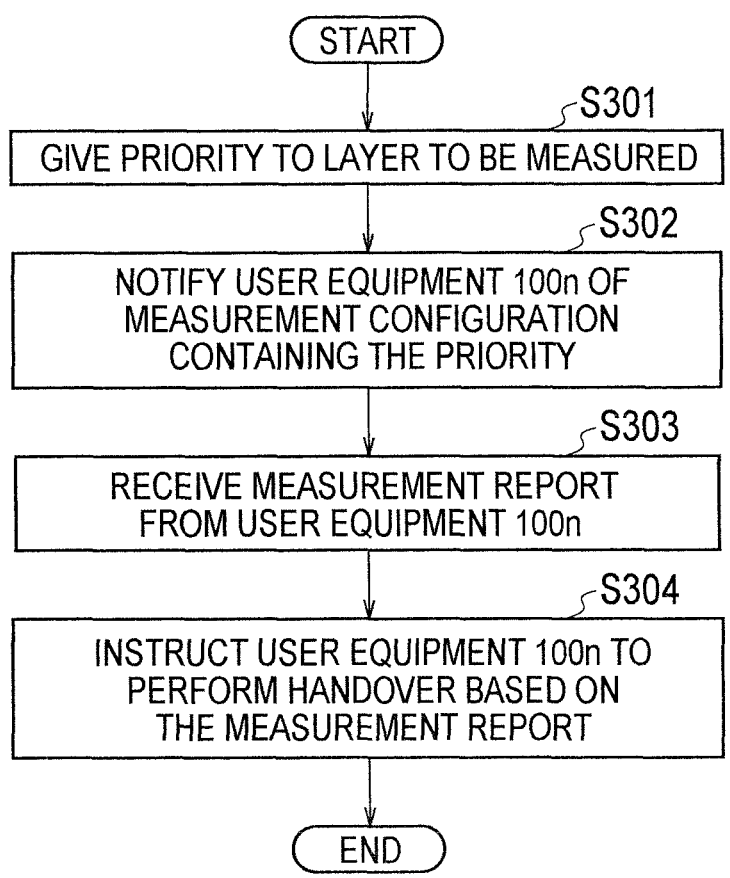
FIG. 13 is a flowchart showing operations of the base station device according to the first embodiment of the present invention.

As shown in FIG. 13, in Step S301, the base station device 200 gives a priority to each layer (each cell) to be measured of the user equipment 100n.

In Step S302, the base station device 200 transmits to the user equipment 100n a "measurement configuration (first control signal)" containing the priority given to each layer (each cell).

In Step S303, the base station device 200 receives a "measurement report" on each layer (each cell) to be measured from the user equipment 100n.

In Step S304, the base station device 200 instructs the user equipment 100n to perform a handover based on the received "measurement report."

Advantageous Effects of Mobile Communication System According to First Embodiment of the Invention The mobile communication system according to the first embodiment of the present invention can realize different-frequency measurement of multiple layers based on a priority of each layer by notifying the priority to the user equipment in the RRC_Connected state, and can also realize fast and high-quality different-frequency handover and different-RAT handover.

Moreover, the mobile communication system according to the first embodiment of the present invention makes it possible to give different priorities to the respective layers between the user equipment 100n in the RRC_Connected state and the user equipment 100n in the Idle state.

In other words, the mobile communication system according to the first embodiment of the present invention enables the user equipment 100n to perform mobility management based on different priorities between the RRC_Connected state and the Idle state.

Note that operation of the above described the user equipment 100n and the base station device 200 may be implemented by means of hardware, a software module executed by a processor, or a combination of both.

The software module may be provided in any type of storage medium such as an RAM (Random Access Memory), a flash memory, a ROM (Read Only Memory), an EPROM (Erasable Programmable ROM), an EEPROM (Electronically Erasable and Programmable ROM), a register, a hard disk, a removable disk, or a CD-ROM.

The storage medium is connected to the processor so that the processor can read and write information from and to the storage medium. Also, the storage medium may be integrated into the processor. Also, the storage medium and the processor may be provided in an ASIC. The ASIC may be provided described the user equipment 100n and the base station device 200. Also, the storage medium and the processor may be provided in the mobile station UE and the radio base station eNB as a discrete component.

Hereinabove, the present invention has been described in detail using the above embodiment; however, it is apparent to those skilled in the art that the present invention is not limited to the embodiment described herein. Modifications and variations of the present invention can be made without departing from the spirit and scope of the present invention defined by the description of the scope of claims. Thus, what is described herein is for illustrative purpose, and has no intention whatsoever to limit the present invention.

All content of the Japanese patent application 2008-074615 (Filing date is 21 Mar. 2008) are described into this application by the reference.

INDUSTRIAL APPLICABILITY

As described above, the present invention can provide a user equipment, a base station device and a mobile communication method, which are capable of realizing different-frequency measurements of multiple layers based on a priority of each layer by notifying the priority to the user equipment in an RRC_Connected state, and capable of realizing fast and high-quality different-frequency handover and different-RAT handover.

The invention claimed is:

1. A user equipment configured to communicate with a base station device, the equipment comprising:
    a connection state processor configured to determine a frequency to be measured in a gap period, to measure, in a connected state, communication quality in each of cells respectively belonging to two or more layers, on the basis of a first priority, to report the measurement result to the base station device, and to perform handover processing according to an instruction from the base station device, the first priority notified by a first control signal notified from the base station device, the connected state being where a radio link between the user equipment and the base station device is established; and
    a stand-by state processor configured to measure, in a stand-by state, communication quality in each of cells respectively belonging to two or more layers on the basis of a second priority, and to determine on the basis of the measurement result a cell for performing a stand-by, the second priority notified by a second control signal notified from the base station device,
    wherein the first priority and the second priority indicate a priority of each layer, the connected state is an RRC_Connected state, and the stand-by state is an Idle state,
    the first priority is discarded when the user equipment transitions from the RRC_Connected state to the Idle state, and
    the second priority is discarded when the user equipment transitions from the Idle state to the RRC_Connected state,
    wherein the connection state processor transmits the measurement result as needed to the base station device as soon as conditions for transmitting the measurement result are met even when measurements of all the layers are not finished.

2. The user equipment according to claim 1, wherein the connection state processor and the stand-by state processor measure communication quality in a cell having a different frequency in the same system or a cell in a different system, as the communication quality in one of the cells respectively belonging to two or more layers.

3. The user equipment according to claim 1, wherein the connection state processor and the stand-by state processor perform measurement of communication quality in a cell with a higher priority before measurement of communication quality in a cell with a lower priority.

4. A base station device configured to communicate with a user equipment, the device comprising:
    a handover processor configured to instruct the user equipment to determine a frequency to be measured in a gap period, and in a connected state to measure and report communication quality in each of cells respectively belonging to two or more layers to obtain a measurement result, and configured to transmit a first control signal containing a first priority and to determine whether or not the user equipment needs to perform handover processing, on the basis of the communication quality in each of the cells respectively belonging to two or more layers, the communication quality measured by the user equipment on the basis of the first priority, the connected state being where a radio link between the user equipment and the base station device is established; and
    a stand-by cell search processor configured to transmit a second control signal to the user equipment in the stand-by state, the second control signal containing a second priority and being used to measure communication quality in each of cells respectively belonging to two or more layers and to determine a cell for camping in a stand-by,
    wherein the first priority and the second priority indicate a priority of each layer, the connected state is an RRC_Connected state, and the stand-by state is an Idle state,
    the first priority is discarded when the user equipment transitions from the RRC_Connected state to the Idle state, and
    the second priority is discarded when the user equipment transitions from the Idle state to the RRC_Connected state,
    wherein the user equipment transmits the measurement result as needed to the base station device as soon as conditions for transmitting the measurement result are met even when measurements of all the layers are not finished.

5. The base station device according to claim 4, wherein communication quality in a cell having a different frequency in the same system or a cell in a different system is measured as the communication quality in one of the cells respectively belonging to two or more layers.

6. A mobile communication method for performing communications between a user equipment and a base station device, the method comprising the steps of:

transmitting from the base station device a first control signal instructing the user equipment to determine a frequency to be measured in a gap period, and in a connected state to measure and report communication quality in each of cells respectively belonging to two or more layers, the connected state being where a radio link between the user equipment and the base station device is established;

transmitting a first control signal from the base station device to the user equipment in a connected state where a radio link between the user equipment and the base station device is established, the first control signal instructing the user equipment to measure and report communication quality in each of cells respectively belonging to two or more layers;

measuring by the user equipment in the connected state the communication quality on the basis of a first priority notified by the first control signal notified from the base station device, and reporting from the user equipment the measurement result to the base station device, the communication quality being in each of the cells respectively belonging to two or more layers;

determining by the base station device on the basis of the communication quality, which is in each of the cells respectively belonging to two or more layers and is notified by the user equipment, whether or not the user equipment needs to perform handover processing;

transmitting a second control signal from the base station device to a user equipment in a stand-by state; and measuring by the user equipment in the stand-by state, on the basis of a second priority notified by the second control signal notified from the base station device, communication quality in each of cells respectively belonging to two or more layers, and determining on the basis of the measurement result a cell for performing a stand-by, wherein the first priority and the second priority indicate a priority of each layer, the connected state is an RRC_Connected state, and the stand-by state is an Idle state, the first priority is discarded when the user equipment transitions from the RRC_Connected state to the Idle state, and the second priority is discarded when the user equipment transitions from the Idle state to the RRC_Connected state, wherein the user equipment transmits the measurement result as needed to the base station device as soon as conditions for transmitting the measurement result are met even when measurements of all the layers are not finished.

* * * * *